United States Patent
Childs

[15] 3,657,100
[45] Apr. 18, 1972

[54] CURRENT-CARRYING SPARGER FOR INTRODUCING FEED TO POROUS ELECTRODE

[72] Inventor: William V. Childs, Bartlesville, Okla.
[73] Assignee: Phillips Petroleum Company
[22] Filed: Aug. 26, 1970
[21] Appl. No.: 67,059

Related U.S. Application Data

[62] Division of Ser. No. 739,508, June 24, 1968, abandoned.

[52] U.S. Cl..............................204/284, 204/289, 204/294
[51] Int. Cl..........................................B01r 3/04, C23b 5/74
[58] Field of Search................204/59, 72, 81, 279, 294, 280, 204/283, 284, 286, 288, 289; 260/671 B

[56] References Cited

UNITED STATES PATENTS

| | | | |
|---|---|---|---|
| 3,393,249 | 7/1968 | Fox et al. | 204/81 X |
| 3,236,759 | 11/1966 | Robinson | 204/286 |
| 3,298,940 | 1/1967 | Ashley et al. | 204/59 |
| 3,017,336 | 1/1962 | Oltstowski | 204/284 X |
| 2,358,419 | 9/1944 | Schumacher et al. | 204/294 X |
| 2,273,795 | 2/1942 | Heise et al. | 204/72 X |

Primary Examiner—John H. Mack
Assistant Examiner—Regan J. Fay
Attorney—Young and Quigg

[57] ABSTRACT

In an electrochemical process, the reaction takes place within the confines of a porous electrode element. The feed materials are introduced into the bottom of this porous electrode element by means of a sparger which is positioned beneath the electrode element but within the bulk of the electrolyte and which is a current-carrying component of the electrode assembly.

5 Claims, 5 Drawing Figures

PATENTED APR 18 1972 3,657,100
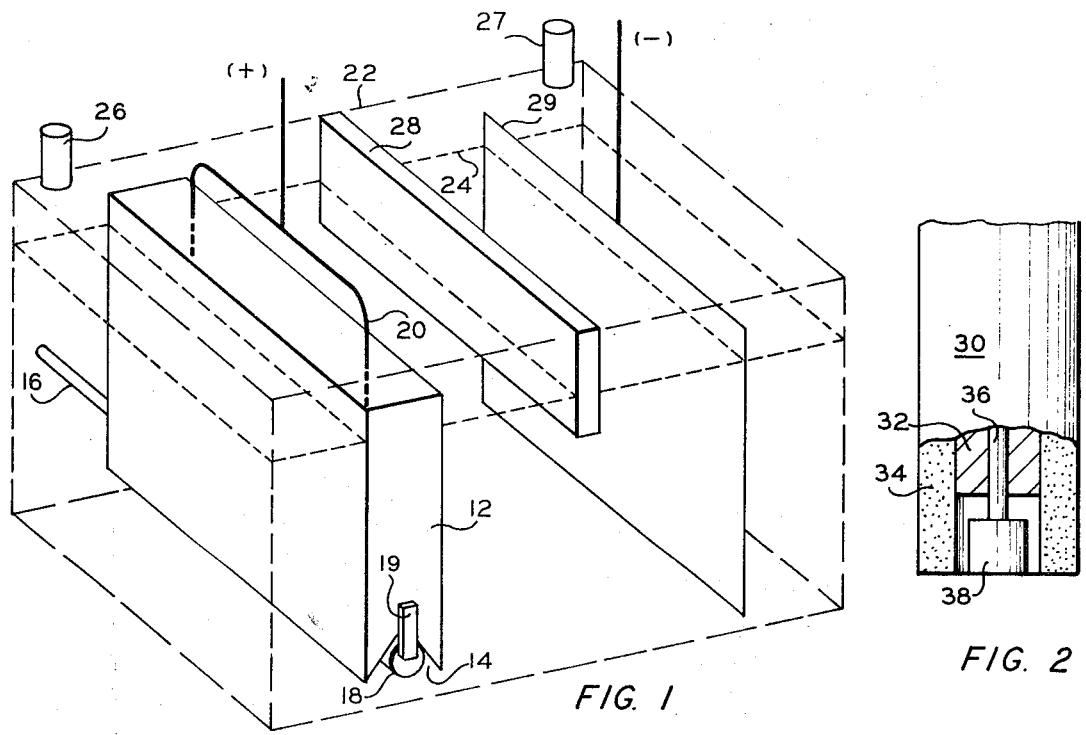
FIG. 1
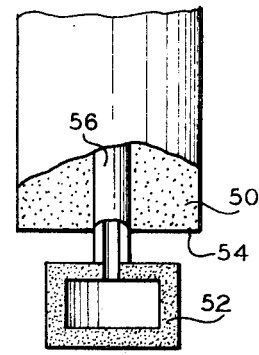
FIG. 2
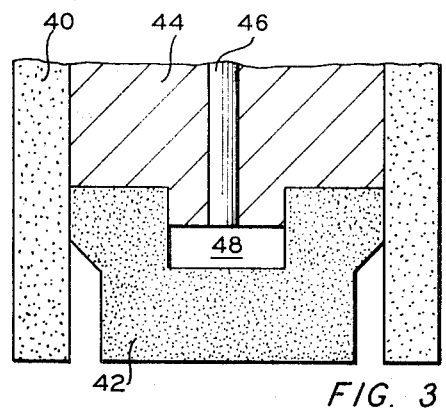
FIG. 3
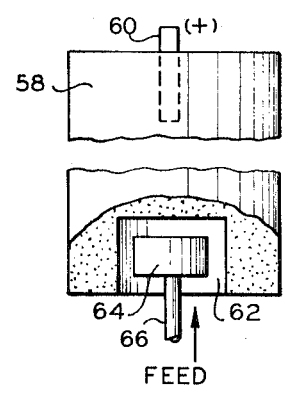
FIG. 4
FIG. 5
INVENTOR.
W. V. CHILDS
BY Young and Quigg
ATTORNEYS

CURRENT-CARRYING SPARGER FOR INTRODUCING FEED TO POROUS ELECTRODE

BACKGROUND OF THE INVENTION

This application is a division of copending application Ser. No. 739,508, filed June 24, 1968, now abandoned.

This invention relates to electrode elements and processes for electrochemical conversions.

Porous electrode elements, particularly porous carbon anodes, are widely used in electrochemical conversion reactions. Generally, the utilization of such elements has involved immersing the element in an electrolyte and passing an electric current through this electrolyte from this element to an oppositely charged element. At least a portion of the materials within the electrolyte is converted into products at one or both electrodes. In a variation of this process, an additional feedstock for the conversion process is bubbled into the electrolyte through a porous electrode element, such as a porous carbon anode, to provide still different products.

Very recently it has been discovered that the reaction in an electrochemical conversion operation can be carried out within the confines of the porous electrode element itself. This type of operation is of particular utility in electrochemical fluorination because it makes possible a simple one-step route to partially fluorinated products which had previously been difficult to obtain. Carrying out the fluorination reaction within the porous anode, in addition to making possible the direct production of partially fluorinated products, also allows operation at higher rates of conversion, and without the formation of substantial amounts of cleavage products generally produced by the older methods when operating at high conversion rates. The feed to be fluorinated is introduced into the porous anode at a point near its bottom and the fluorinated mixture exits at the top of the anode, generally above the electrolyte level. Passage of the feed into the bulk of the electrolyte is avoided.

It is apparent that if the reaction is to take place within the electrode element, larger electrodes are desirable in order to increase the available surface area wherein the reaction takes place. However, with larger electrodes, it has been found that a nonuniform distribution of feed materials can result within the electrode. Nonuniform distribution of the feed material results in a partial loss of the advantage of this type of operation with respect to the production of only partially fluorinated products; this is because in systems, for instance, utilizing a KF·2HF electrolyte, the fluorinating species are generated continuously throughout the submerged surface of the electrode element and thus, in areas where feed is not distributed properly, the excess of fluorinated species will fluorinate the available feed all the way to perfluoro products, or even produce undesirable cleavage products. Also, nonuniform feed distribution can result in sudden contact of accumulated fluorine with accumulated feed material or with hydrogen from the other electrode element to give an explosive reaction. Thus it can be seen that uniform distribution of the feed material and, consequently, uniform contact of the feed material with the electrolyte at the point of reaction is of prime importance.

This problem of nonuniform distribution of the feed material can be solved to some extent by using feed distribution laterals in the lower portion of the electrode element. However, these feed distribution laterals, unless protected in some fashion, can tend to become flooded with electrolyte and to become plugged on continued usage. The problem of nonuniform distribution of feed material can also be solved to a great extent by using a sparger located within the bulk of the electrolyte adjacent the bottom of the porous electrode element.

SUMMARY OF THE INVENTION

It is an object of this invention to provide an improved process and apparatus wherein the reaction in an electrochemical conversion process using a porous electrode element is carried out within the confines of the electrode element; it is yet a further object of this invention to provide for uniform distribution of feed to a porous electrode element; and it is a further object of this invention to provide a porous electrode element assembly wherein plugging of the feed distribution means is alleviated.

In accordance with this invention gaseous or vaporous feed materials are introduced into the porous electrode element by means of a sparger located within the bulk of the electrolyte adjacent to a bottom surface of the porous element, said sparger being a current-carrying component of the electrode assembly including being in electrical connection with said electrode element.

BRIEF DESCRIPTION OF THE DRAWINGS

In the drawings, forming a part hereof, in which like reference characters denote like parts in the various views, FIG. 1 is a schematic representation of an electrochemical cell utilizing a sparger in accordance with the instant invention;

FIG. 2 is a side elevational view partially in section of an electrode element and integral sparger in accordance with an alternative embodiment of the invention;

FIG. 3 is a sectional view of an electrode element and integral sparger in accordance with another alternative embodiment of the instant invention;

FIG. 4 is a cross-sectional view of the lower portion of an electrode element having an integral sparger in accordance with another alternative embodiment of the instant invention; and FIG. 5 is a cross-sectional view of the lower portion of an electrode in accordance with another alternative embodiment of the instant invention.

DESCRIPTION OF THE PREFERRED EMBODIMENTS

The spargers of the instant invention can be positioned either within a cavity in the bottom of the electrode element which cavity is open to the bulk of the electrolyte, as shown by FIGS. 1 to 3, or the spargers can be positioned below the bottom of a flat bottom porous electrode element as shown by FIG. 4.

It is most unexpected that the problem of plugging of the sparger element can be alleviated by making the sparger a current-carrying part of the electrode. One would have expected that making the sparger an integral part of the electrode element whereby it is in electrical connection with the electrode element, would detract from the very advantage of having a separate sparger element, rather than enhance the advantage experienced in utilizing a separate sparger element. This is because making the sparger a current-carrier results in some electrochemical conversion at the sparger itself. This is a relatively undesirable type of conversion in that it employs the less effective mode of bubbling the feed into the bulk of the electrolyte. But because the sparger is relatively small, and because only a small current need be used, and because only a very small fraction of the feed is converted in this mode, the present invention provides a substantial overall improvement.

In the embodiment utilizing a cavity, the size and shape of the cavity can vary depending upon the size and shape of the electrode element. The shape of the sparger is preferably complementary to the shape of the cavity as shown in the drawings, although this is not essential. With a cylindrical electrode, a hole can simply be drilled in the bottom of the electrode to form the cavity. With a slab-type electrode, the cavity can take the form of an elongated recessed portion in the bottom of the electrode.

A nonwetting electrolyte is used; therefore, the feed materials are far more compatible with the surface of the electrode element than is the electrolyte, and for this reason they are very rapidly absorbed into the porous electrode element. Even in arrangements such as that shown in FIG. 4, the feed materials are rapidly absorbed by the porous electrode element and do not bubble out into the electrolyte except for the distance it travels in going directly from the sparger to the bottom of the porous electrode element, thus allowing the essential mode of operation whereby the reaction takes place within the confines of the pores of the porous electrode element.

The choice of the material to make the porous sparger is extremely important. The sparger must give good distribution at very low flow rates, the low flow rates being required to give sufficient conversion of the feed per pass. Materials which are not wetted by the electrolyte are presently preferred. Such materials can either be inherently nonwettable by a given electrolyte or can be rendered nonwettable by conventional application of a wet-proofing agent. In electrochemical fluorination systems using HF-containing electrolyte, carbon is by far the preferred material. Other materials which resist wetting by the electrolyte, such as metals or conductive plastics, can also be used if they are not corroded by the system and if the pore size can be small enough and uniform enough that the pressure drop is sufficient to keep the electrolyte out of the sparger. It is essential, however, that the sparger be made of a material which is electrically conductive.

The maximum pore size in the sparger depends somewhat upon the depth of operation. At a 12-inch depth the hydrostatic head can sometimes be sufficient to cause the electrolyte to invade pores larger than about 70 microns. In shallower depths the largest pores can be a little larger while at immersion depths greater than 12 inches, the largest pores must of necessity be smaller to avoid flooding of the sparger by the electrolyte. To be safe in avoiding a few large pores, the average pore size of the sparger should be small, for instance less than about 20 microns. Thus, suitable porous materials having an average pore size of 0.01 to 30, preferably 0.1 to 10, microns can be used. The sparger should have a permeability in the range of from about 0.001 to about 4, preferably 0.02 to about 0.5 darcys. The total porosity or void space in the porous sparger is of less importance; it will generally total less than about 35 percent. The relatively small and uniform pores of the sparger allows the feedstock to be introduced from a plurality of points and in the form of a multitude of very small bubbles.

The porous electrode element can be any porous electrode material suitable for electrochemical conversion reactions taking place within the confines of the electrode material, specifically within the pores of the electrode material. It can consist of a single piece of uniform porous carbon. It can have a varying porosity with smaller pores at the bottom and larger pores at the top so as to enable deeper immersion into the electrolyte. It can have varying porosity from outside to inside, with the smaller pores in the core section and the larger pores on the outside in contact with the electrolyte. It can also be a three-section "sandwich" electrode element having large pores in the outer section surrounding a central core, said large pores being in contact with the electrolyte, and the core being comprised of an impermeable current-conducting material such as nonporous carbon or metal. It is generally desirable that the outer section of the composite electrode element be comparatively thin for uniformity of conversion. For example, outer sections of less than 1 in thickness, preferably less than 0.5 inch, can be utilized with advantage.

In the porous electrode element, the average pore diameter of the porous reaction section will generally be in the range as through from 1 is about 150 microns, preferably between 40 and 140 microns and still more preferably between 50 and 120 microns. These values depend somewhat on the depth of immersion of the electrode with deeper immersions requiring somewhat smaller pores. Generally, the permeability of such electrodes will be in the range of 0.5 to 75 darcys, preferably from about 5 to about 75, and still more preferably 10 to 70, darcys. In general, the total porosity will be in the range of about 15 to about 60 percent.

The feed material is discharged into the cavity where it is rapidly absorbed into the porous electrode element. While it is not desired to limit the invention to any theory of operation, it is believed that the electrolyte partially penetrates the electrode through some of the larger pores. The feed material distributes itself throughout the porous electrode and migrates to near the outer surface to form a three-phase boundary of feed, electrolyte, and electrode element, at which point the reaction takes place. The product and unreacted feed then migrate up to the portion of the electrode element above the electrolyte level where they are collected, without ever having broken out of the bulk of the electrolyte (the feed is momentarily in contact with the bulk of the electrolyte when it bubbles out of the sparger).

The porous portion of the porous electrode elements of the electrode assemblies of the instant invention can be fabricated from any suitable conducting porous electrolyte resistant material which is compatible with the system, for instance nickel, iron, various metal alloys, and carbon, which is not wetted by the electrolyte. By "not wetted" is meant that the contact angle between the electrolyte and the electrode must exceed 90° in order that anticapillary forces will prevent substantial invasion of the small pores of the porous element by the electrolyte. Porous carbon, which is economical and readily available in ordinary channels of commerce, is presently preferred for said porous element. In many instances, it is advantageous to provide a metal element in contact with the porous carbon element. For instance, a porous carbon anode can have a nickel screen wrapped around it.

The electrode assemblies of the invention can be employed in any convenient cell configuration or electrode arrangement. The only requirements are that the cell body and the electrodes in the cell be fabricated of materials which are resistant to the action of the contents of the cell under the reaction conditions. Materials such as steel, iron, nickel, polytetrafluoroethylene (Teflon), carbon, and the like can be employed for the cell body. The electrode is assembled such that feed is introduced into the reaction section of the electrode by positioning the sparger feed section adjacent a bottom surface. The sparger is in communication with the feed supply.

The electrode assemblies of the instant invention can be employed in a wide variety of electrochemical conversion processes in which the porous electrode is not wetted by the particular electrolyte being used, and wherein the reaction takes place within the confines of the electrode element. Some examples of such processes are electrochemical halogenation, electrochemical cyanation, and cathodic conversion such as the reduction of alcohols to hydrocarbons or the reduction of acids to alcohols. One electrochemical conversion process in which the electrode assemblies of the instant invention are particularly valuable is the electrochemical fluorination of fluorinatable materials in the presence of an essentially anhydrous liquid hydrogen fluoride containing electrolyte.

In the operation of the invention, a current is passed through the conductive sparger in the same direction as through the electrode element which is fed by that sparger. The current is made to flow through the sparger simply by applying sufficient voltage between the sparger and the nearest electrode of opposite polarity. Any measurable level of current is adequate as a minimum, and the sparger current generally will not exceed that of the reaction section of the electrode element. Although the sparger can be made a current carrier simply by being made electrically integral with the electrode, it is frequently preferable to utilize a much smaller current through the sparger by means of a separate circuit.

Any flow of current through the sparger will produce electrolysis at the sparger. Hence, the feed material flowing through the sparger can be converted to some extent. However, because of the relatively small size of the sparger, and particularly if there is a relatively low current level through it by virtue of being separately connected to the electrical source as shown by FIG. 5, only a minor amount of the feed will be converted at the sparger.

Referring now to the drawings, particularly FIG. 1, there is shown in schematic representation a complete electrochemical conversion cell having a porous electrode element 12. In the bottom of porous anode 12 is cavity 14. Feed from line 16 is introduced into sparger 18 which is positioned within the bulk of the electrolyte within cavity 14. Sparger 18 is made an integral part of electrode element 12 by means of electrically conductive strap 19. Thus, current flows through sparger 18 as it does other portions of the anode. Current collector 20 is embedded in the upper portion of porous electrode element 12. Said porous electrode element 12 is disposed in cell container 22. The upper end of said porous electrode element is above the level of the electrolyte in said container as depicted by reference character 24. Thus, the upper end surface of porous electrode element 12 comprises a second surface for withdrawing unreacted feedstock and product from the pores of porous electrode element 12, the inner wall of cavity 14 comprising a first surface for the introduction of feed materials into the pores of said porous element 12. Conduit 26 comprises a second conduit means for withdrawing product and unreacted feedstock from within the pores of porous electrode element 12. If desired, the space above the electrolyte can be divided by a partition 28 extending from the top of the cell to below the level of the electrolyte to keep the anode products separated from the cathode products; or a conventional cell divider can be employed to divide the cell into an anode compartment and a cathode compartment. However, such a divider is not essential. A separate conduit 27 removes material generated at cathode 29.

Referring now to FIG. 2, there is shown a side elevational view, partially in section, of a cylindrical electrode element 30 having a core portion 32 of impervious material surrounded by an outer section 34 of relatively large pore diameter carbon. Centrally disposed within impervious core 32 is copper tube 36 which serves as a current collector and feed introduction means. Intimately attached to said copper tube is sparger 38 which is comprised of relatively low pore diameter carbon. Sparger 38 is thus an integral part of electrode element 30 and in electrical connection therewith through copper tube 36.

Referring now to FIG. 3, there is shown a rectangular anode in accordance with an alternate embodiment of the instant invention having outer sections 40 of relatively high pore diameter carbon, a sparger 42 made of relatively low pore diameter carbon and integrally affixed to the anode, and a core portion 44 comprised of essentially impervious carbon. Centrally disposed through said core is hollow copper tube 46 which serves the dual function of transmitting the feed material into channel 48 of sparger 42 and also serving as current collector.

Referring now to FIG. 4, there is shown the lower portion of a porous carbon anode 50 having a sparger 52 disposed just beneath flat bottom 54 of said anode 50. Sparger 52 is attached to centrally disposed copper tube 56 thus making it in electrical connection with the body of porous anode 50.

In FIG. 5 there is shown a cylindrical porous electrode assembly useful as an anode in an electrochemical process. Porous electrode element 58 is fitted with metal current collector 60 and contains a cavity 62 in its underside. Electrically conductive porous sparger 64, in communication with conductive pipe 66 is positioned within said cavity. Pipe 66 serves the dual function of supplying feed material to the sparger and of collecting current from the sparger. Though both current collector 60 and conductive sparger 64 are anodic, sparger 64 carries less current and has a lower current density as a result of being separately connected to a positive source of electricity; this is contrasted with the other figure where the sparger is anodic simply by virtue of being integral with the rest of the anode.

While it is not specifically shown in the drawings, at all points where the metallic combination current collector and feed introduction means is in contact with the electrolyte, an insulation is provided to prevent corrosion. For instance the portion of copper tube 36 in FIG. 2 between sparger 38 and core 32 is coated with a protective layer of Teflon polytetrafluoroethylene.

Many conventional parts, such as electrical circuitry, flow regulators, and the like, have not been shown for the purpose of simplicity but their inclusion is understood by those skilled in the art as within the scope of the invention.

EXAMPLE I

A cylindrical porous carbon sparger (constructed of Stackpole 139 carbon which has an average pore size of about 3 microns, a permeability of about 0.056 darcys and a total porosity of about 30 percent) measuring 1 inch in diameter by 1 ½ inches long, was hollowed out by drilling an axial hole about one-half inch in diameter to within about one-half inch of the end of the cylinder. A Teflon pipe was threaded into the open end of the sparger. A length of iron pipe passed through the Teflon pipe and, with the aid of a steel spring, was in electrical contact with both the sides and bottom of the sparger cavity.

The sparger was immersed 12 inches into a molten KF·2HF electrolyte in a conventional electrochemical fluorination cell equipped with an iron cathode but without the anode which contained the porous carbon reaction section which is normally fed by the sparger. A 100 ml/hr flow of ethylene dichloride feed was continually passed through the sparger for the duration of the test.

For the first 24 hours of the test, the feed material was merely passed through the sparger with no current flow through the sparger. During this period the sparger pressure (the pressure required on the feed to overcome the resistance of the sparger to maintain the feed rate) rose from about 1 ½ psig to about 5.8 psig.

At this point in the test, the sparger was made anodic and a 6 amp current was passed through it (resulting of course, in the fluorination of a small amount of the feed passing through the sparger). The sparger pressure immediately dropped to about 2 psig. During the next 48 hours the sparger pressure rose to only about 4.4 psig.

The current through the sparger was then halted again and the sparger pressure rose rapidly to about 10 psig in about 6 hours.

Reapplying the 6 amp current reduced the pressure from 10 about 3 psig in about 1 ½ hours. The feed flow was then replaced with a nitrogen flow and the current was halted for the weekend.

The feed flow was resumed and with no current flow, the sparger pressure increased to about 11 ½ psig in about 5 hours. The feed line and sparger were then purged with a flow of HF which reduced the pressure to about 1 ¾ psig. However, continued feed flow without current flow resulted in an increase to about 7.8 psig in about 1.5 hours.

Ten amp current was then applied and after 22 hours the sparger pressure was only about 4 psig.

These tests show that, without a flow of current through the sparger, the sparger pressure increases with time. The pressure can be reduced by a HF purge, but the interval between such purges can be greatly extended if the sparger is made anodic. The improved result is obtained at more than one current level.

EXAMPLE II

In another similar test wherein ethylene dichloride is converted to dichlorotetrafluoroethane and related products, an anode assembly similar to that of FIG. 4 is employed. The reaction section of the electrode is a cylinder of porous carbon (National Carbon 60 having an average pore diameter of about 45 microns, a permeability of about 6 darcys, and a total porosity of about 50 percent). The sparger is essentially identical to that of Example I.

Operating at an electrolyte temperature of about 95° C., a liquid feed rate of about 100 ml/hr, an anode current density of about 400 ma/cm$^2$, a sparger current density of about 50 ma/cm$^2$, a voltage of about 8 volts, and with continuous replenishment of the consumed HF, the ethylene dichloride is smoothly converted to fluorination products over a 24 hour period with negligible increase in the sparger pressure.

While this invention has been described in detail for the purpose of illustration it is not to be construed as limited thereby but is intended to cover all changes and modifications within the spirit and scope thereof.

I claim:

1. An electrode assembly, suitable for carrying out electrochemical reactions in an electrolysis cell containing an electrolyte, comprising, in combination:
    an electrode element comprising a porous material, said element having a flat bottom which comprises a first surface for introducing a reactant feedstock into the pores of said electrode element;
    a current collector comprising a metal tube extending through said electrode element beyond the bottom thereof; and
    a sparger comprising an electrically conductive material supported on said current collector and spaced from the bottom of said electrode element.

2. An electrode assembly in accordance with claim 1 wherein said electrode element is generally cylindrical in shape.

3. An electrode assembly in accordance with claim 2 wherein said electrode element comprises porous carbon.

4. An electrode assembly in accordance with claim 3 wherein said sparger also comprises porous carbon.

5. An electrode assembly in accordance with claim 1 wherein:
    said electrode element comprises a generally cylindrical rod of porous carbon;
    said sparger is generally cylindrical in shape, is closed at one end thereof, and comprises porous carbon; and
    said sparger is disposed below said bottom with the open end thereof fixed in electrical connection to said extended end of said current collector so as to enclose the open end thereof.

* * * * *